S. L. CASELLA.
MACHINE FOR POLISHING BATTERY CELLS.
APPLICATION FILED MAR. 29, 1918.
1,388,403.
Patented Aug. 23, 1921.
4 SHEETS—SHEET 1.
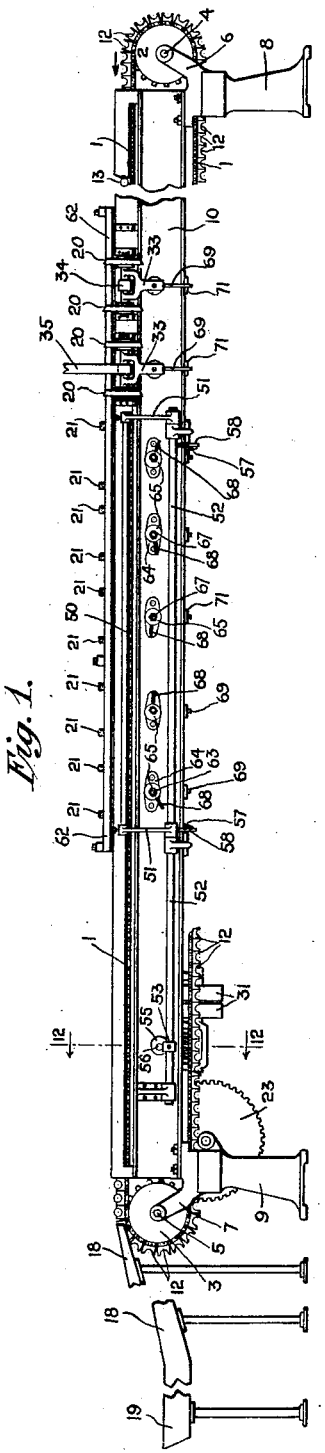
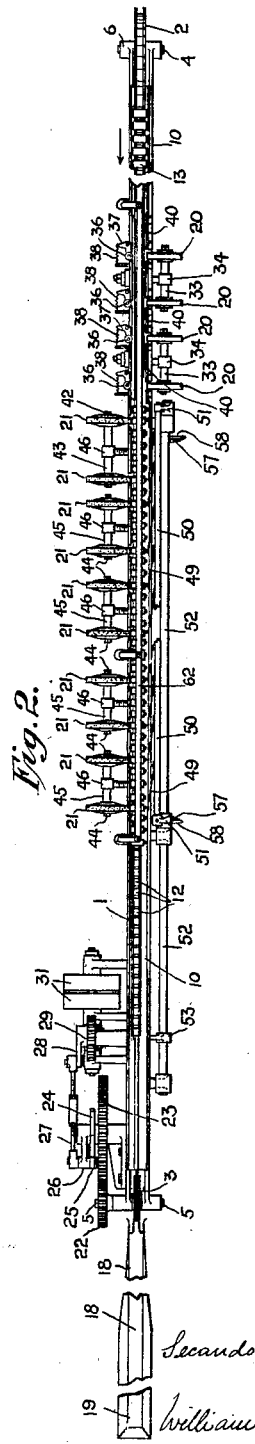
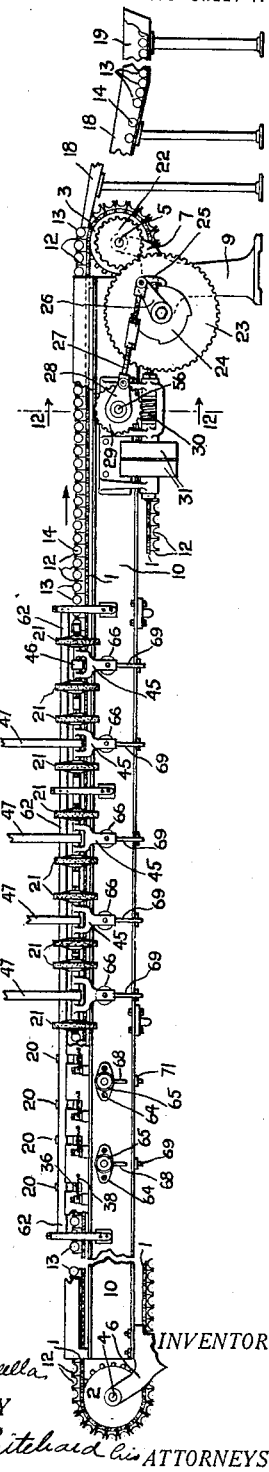
INVENTOR.
Secundoh Casella
BY
Williams & Pritchard
ATTORNEYS.

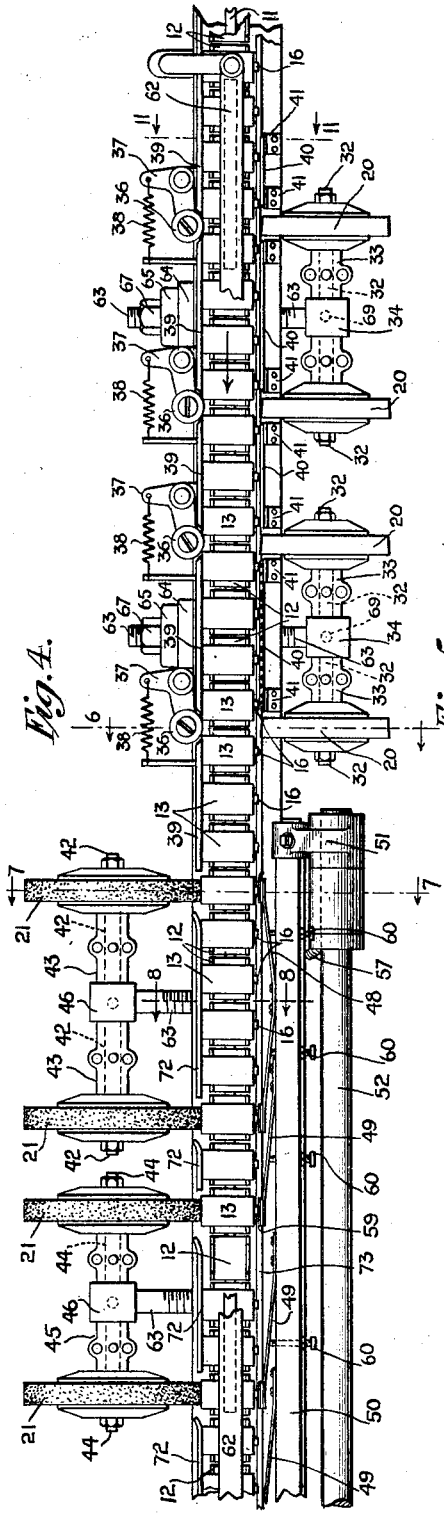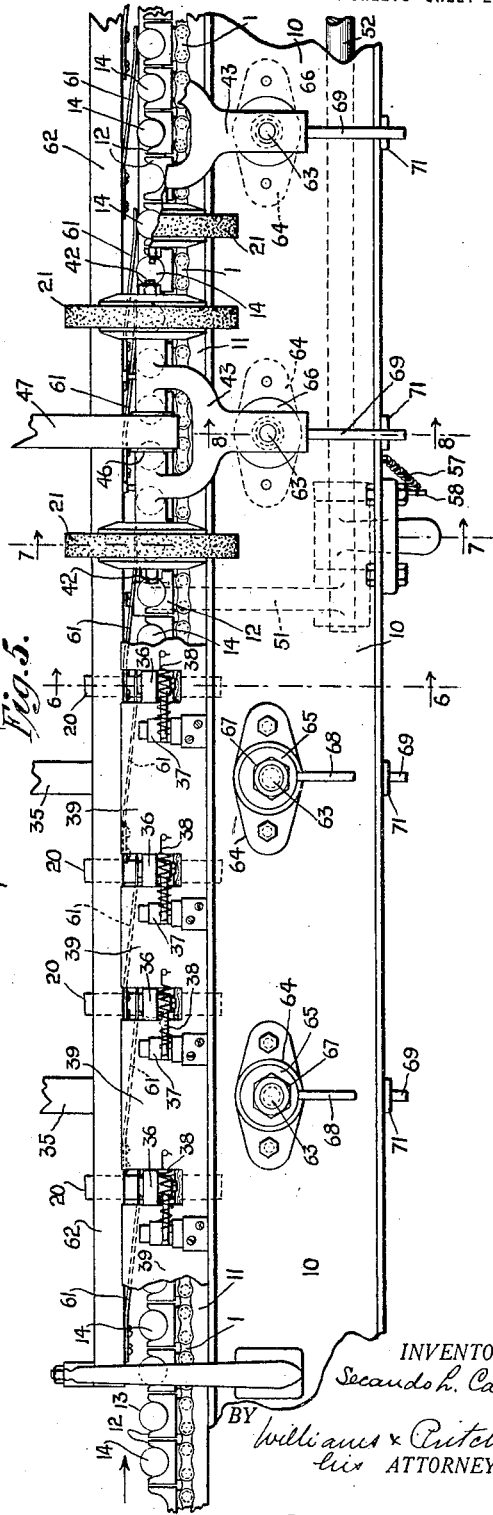

S. L. CASELLA.
MACHINE FOR POLISHING BATTERY CELLS.
APPLICATION FILED MAR. 29, 1918.
1,388,403.
Patented Aug. 23, 1921.
4 SHEETS—SHEET 3.
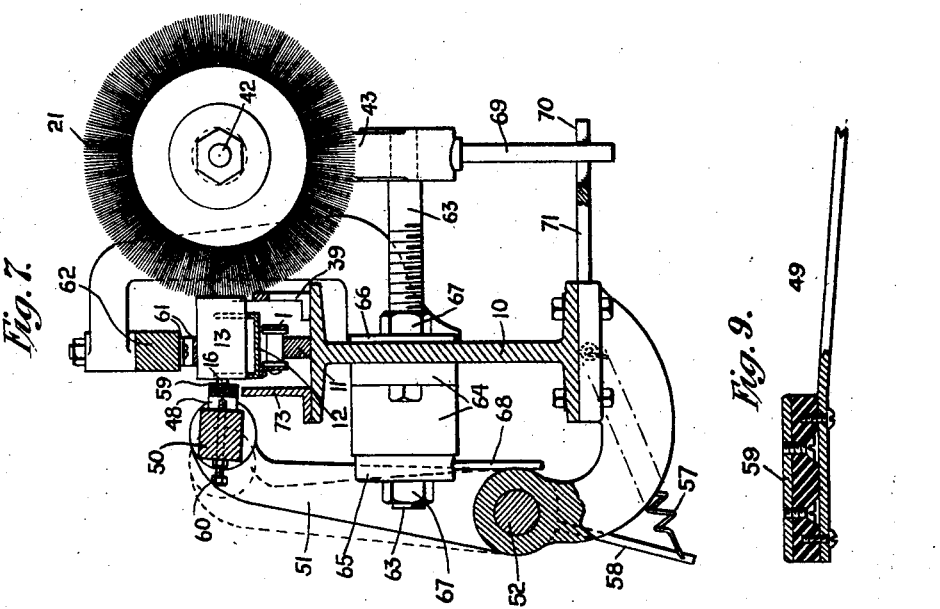
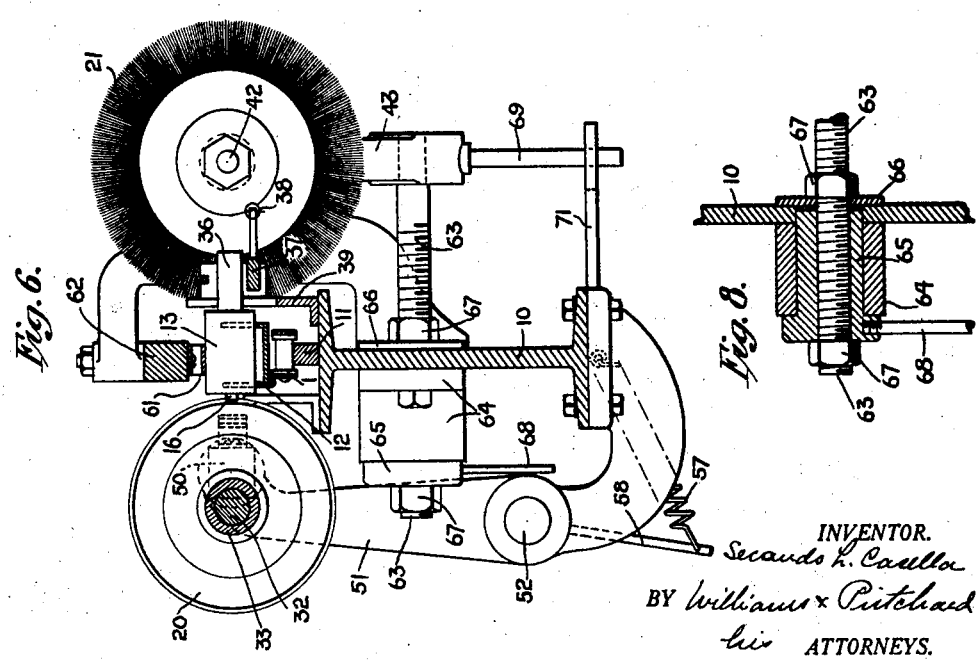
INVENTOR.
Secundo L. Casella
BY Williams & Pritchard
his ATTORNEYS.

S. L. CASELLA.
MACHINE FOR POLISHING BATTERY CELLS.
APPLICATION FILED MAR. 29, 1918.
1,388,403.
Patented Aug. 23, 1921.
4 SHEETS—SHEET 4.
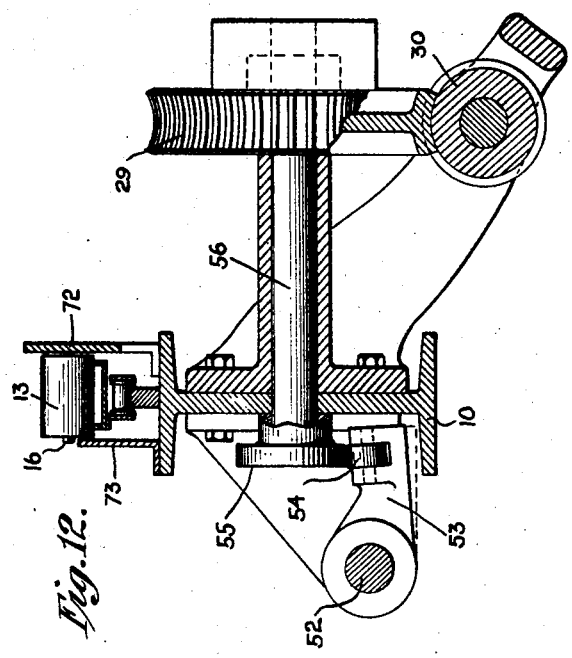
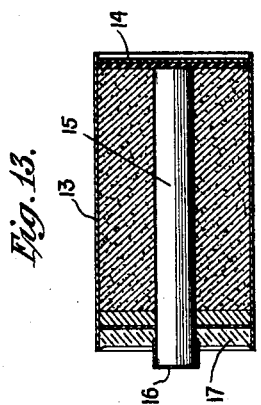
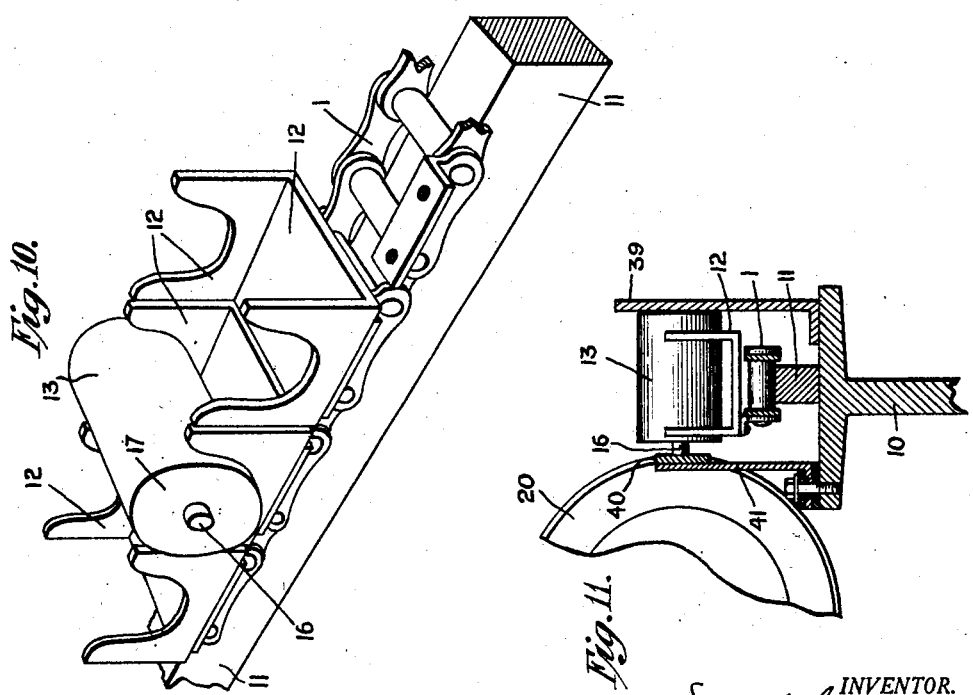
INVENTOR.
Serando L. Casella
BY Williams & Pritchard
his ATTORNEYS.

UNITED STATES PATENT OFFICE.

SECONDO L. CASELLA, OF NEW YORK, N. Y., ASSIGNOR TO NATIONAL CARBON COMPANY, INC., OF NEW YORK, N. Y., A CORPORATION OF NEW YORK.

MACHINE FOR POLISHING BATTERY-CELLS.

1,388,403.   Specification of Letters Patent.   Patented Aug. 23, 1921.

Application filed March 29, 1918. Serial No. 225,386.

*To all whom it may concern:*

Be it known that I, SECONDO L. CASELLA, a citizen of the United States, residing in the borough of Manhattan, in the county of New York and State of New York, have invented certain new and useful Improvements in Machines for Polishing Battery-Cells, of which the following is a specification, reference being had therein to the accompanying drawings, forming part thereof.

My invention relates to a machine for cleaning or polishing the opposite contact-making ends of the cells of usual dry batteries so as to assure a good circuit-completing contact relation, one of these contact-making ends or end parts being the usual brass cap upon the projecting end of the carbon electrode rod forming the central terminal of the battery cell, and the other contact-making end part being the exposed outer bottom surface of the usual zinc cup. Heretofore this cleaning or polishing operation has commonly been performed manually by an operator who takes the battery cells in his hand one at a time and brings first one end thereof and then the other end thereof into contact with a rapidly rotating grinder or polishing wheel, usually an emery wheel. This method of polishing the batterly cells is slow and expensive. Objects of my invention are to effect this cleaning or polishing operation more expeditiously and at less expense than heretofore. Other objects of my invention are to produce a machine which is simple in construction, inexpensive of manufacture, reliable, durable, convenient to use and having other advantages which will hereinafter appear.

My invention includes novel means for effecting the polishing operation while the battery cells are moved along from one location to another, for example, by means of an endless carrier such as a conveyer chain upon which the battery cells are arranged transversely with their like ends projecting in the same direction. According to one feature of my invention, the carrier chain is moved step by step intermittently to an extent greater than the distance between two adjacent battery cells and to an extent corresponding to a plurality of several of the battery cells, and the polishing devices are so adapted and arranged that the proper abrasive action or polishing will be effected upon each of the terminal-forming ends of the battery cell without either of these terminal-forming ends being ground through so as to make a hole in the sheet metal of which they are formed. For effecting these results, according to one feature of my invention, the polishing of the usual brass caps is effected by means of a suitable number of grinders, such as abrasive wheels, during a period of movement of the battery cells as they pass or travel past these grinders, and the polishing of the bottoms of the usual zinc cups is effected during the periods of rest of the battery cells by means of polishing devices, such as rotating brushes, which are arranged in a series and so spaced that the bottom of each of a plurality of non-adjacent battery cells receives one polishing during one period of rest and that the bottom of each of another plurality of similarly non-adjacent battery cells in the series receives a like polishing during another period of rest, and so on until the bottoms, of all the cells in the series have been polished, the arrangement being such that all of the other cells come to rest out of contact with the polishing devices while the bottoms of any plurality of cells are being polished. My invention also more particularly includes various features of construction and combinations of parts as will appear from the following description.

I shall now describe the battery polishing machine illustrated in the accompanying drawings as an embodiment of my invention and shall thereafter point out my invention in claims.

Figure 1 is a front elevation of the complete machine with parts omitted.

Fig. 2 is a plan view of what appears in Fig. 1.

Fig. 3 is a rear elevation with parts omitted.

Fig. 4 is an enlarged partial plan view of what appears at the right of the center in Fig. 2.

Fig. 5 is a rear elevation of what appears in Fig. 4 .

Fig. 6 is a transverse section on a vertical plane indicated by the line 6—6 of Figs. 4 and 5 as viewed from the right in Fig. 4 and from the left in Fig. 5, but showing a different phase of operation in which one of the usual terminal-forming brass caps of a battery cell is being ground or polished during a period of movement of the endless conveyer or carrier chain.

Fig. 7 is a similar view indicated by the line 7—7 of Figs. 4 and 5, but with the carrier chain at rest as shown in Figs. 4 and 5 for thereby effecting the polishing of the bottoms of the zinc cups of the battery cells.

Fig. 8 is a partial transverse section on a vertical plane indicated by the line 8—8 of Figs. 4 and 5 as viewed from the right in Fig. 4 and from the left in Fig. 5, and shows the supporting and adjusting means for any respective pair of the polishing wheels.

Fig. 9 is an enlarged partial longitudinal horizontal section of the operating end of one of the presser springs and shows the insulating means provided to prevent the short-circuiting of the battery cells.

Fig. 10 is a further enlarged perspective view of a part of the endless carrier chain or endless conveyer for the battery cells and of the underlying bar by which it is supported and guided.

Fig. 11 is a less enlarged partial transverse section on a vertical plane indicated by the line 11—11 of Fig. 4 as viewed from the right and shows the means for insulating the guides for the ends of the battery cells having the terminal-forming brass caps thereon so as to prevent the short-circuiting of the battery cells.

Fig. 12, drawn to the scale of Figs. 6 and 7, is an enlarged partial transverse section on a vertical plane indicated by the line 12—12 of Figs. 1 and 3 as viewed from the right in Fig. 1 and from the left in Fig. 3, and shows particularly the means for operating the presser bar for holding the bottoms of the zinc cups in polishing relation with the polishing wheels.

Fig. 13 is a central longitudinal section of a battery cell, drawn to a larger scale than in the preceding figures.

The battery polishing machine embodying my invention illustrated in the accompanying drawings has a horizontally arranged endless carrier chain or conveyer chain 1 which is carried by or passes over similar sprocket wheels 2 and 3 shown as journaled by means of short transverse shafts 4 and 5 in similar bearing brackets 6 and 7 which project from supporting pedestals 8 and 9 which are connected together by a long horizontally arranged main frame member 10 which is shown as an I-beam, the sprocket wheel 2 being located at the feed end of the machine and the sprocket wheel 3 being located at the delivery end thereof. The middle parts of the carrier chain or conveyer chain 1 between the sprocket wheels 2 and 3 rest upon and are supported and guided by a bar 11 arranged along the top of the main frame member or I-beam 10. Each alternate link of the conveyer chain 1 is provided with a carrier bracket 12 shown as of shell construction or as hollowed out between its ends so as to provide at each end thereof a substantially U-shaped fork for receiving the cylindrical can body or cup body 13 of a battery cell.

So far as the present purpose is concerned, and as shown in Fig. 13, each of these battery cells may be considered as including a zinc cup forming one terminal of the battery and comprising the cylindrical body part 13 and a bottom disk 14 commonly spaced slightly inward and soldered in place, a central carbon electrode rod 15 forming the other terminal of the battery and provided at its outer end with a usual contact-making brass cap 16, the outer open end of the cup body 13 commonly being closed by means of an outer layer 17 of sealing wax.

In the machine illustrated in the drawings, the battery cells are manually placed in position by attendants at the right end of the machine as it appears in Figs. 1 and 2 and which therefore may be called the feed end of the machine, and these attendants place the battery cells to be polished upon the carrier chain 1 within the forked brackets 12. The carrier chain by means of the carrier brackets 12, which are equidistantly spaced thereon, moves the battery cells from one end of the machine to the other, during which time and between these locations the polishing operations take place. It is to be noted that in feeding the machine the attendants place the battery cells in position upon the conveyer chain 1 and in the forked brackets 12 with their exposed brass caps 16 projecting in the same direction and toward the front of the machine, as clearly appears in Figs. 2, 4, 6, 7, 10, 11 and 12. Should the attendants doing the feeding fail to fill all of the carrier brackets 12 with cells, no harm can result, and such a vacant bracket 12 is shown at the left in Fig. 4 and at the right in Fig. 5.

After the completion of the two polishing oprations, the battery cells are delivered from the other end of the machine beyond the chain-carrying sprocket wheel 3 upon the upper end of a downwardly inclined delivery chute 18 down which these cells are permitted to roll into a horizontally arranged receiving trough 19 from which the polished cells may be removed by attendants stationed at this end of the machine, which is the delivery end thereof.

One of the requirements of a machine for performing the polishing operations is that the sheet metal must not be ground through so as to make a hole either in the bottom disk 14 of the zinc cup or in the outwardly exposed end of the sheet brass cap 16. Another requirement of such a polishing machine is that in effecting the polishing of the bottom 14 of the zinc cup, the usually slightly projecting edge of the cylindrical cup body 13 must not be ground in such a manner as to leave a bur which would project and would interfere with the assembling of the battery cells in their usual outer paper containers or cartons. Accordingly, in producing a machine for effecting these polishing operations, I have found it desirable and advantageous to subject the exposed outer ends of the sheet metal brass caps 16 to a grinding operation for a very limited time by means of one or more abrasive grinders, such for example as the grinding wheels 20, of which a series of four are shown in the particular machine illustrated in the drawings; and to subject the bottom disk 14 to a more prolonged polishing operation effected by means of brushes 21 which may be rotating wire brushes. I have found that the polishing of the brass caps 16 is most readily effected while the battery cells are moving past the grinders 20, for thereby giving the required short periods of abrasion, and that the polishing of the bottom disks 14 is best effected by holding the battery cells stationary with their bottoms 14 in contact with the rotating brushes 21 during the polishing operation, so that these polishing brushes will have sufficient time to act and will not disturb the projecting slight flange or edge of the cup body 13 at the bottom of the cell, as would occur were the bottoms of the battery cells moved along past abrasive grinders, such, for example, as the grinders 20 employed for the brass caps 16.

In order to effect these above mentioned grinding and brushing operations during periods of movement and of rest, respectively, of the battery cells, means are provided for imparting step by step intermittent traveling movement to the endless conveyer chain 1. A gear wheel 22 is fixed upon the rear projecting end of the journal shaft 5, upon which the sprocket wheel 3 at the delivery end of the machine is fixed, and this gear 22 is engaged by a larger gear 23. At its side the larger gear 23 carries a four-tooth ratchet disk 24, the peripheral ratchet teeth of which are engaged by a hook-pawl 25 pivotally carried by a rock arm 26 which is pivoted concentric with the ratchet disk 24 and large gear 23. A pitman or connecting-rod 27 connects the rock arm 26 with a crank 28 which is carried by a worm wheel 29 driven by a worm 30 which may be rotated by any suitable driving means, for example, by means of a usual belt on one of the pulleys 31, the other of these pulleys being a usual loose pulley. The pawl-carrying rock arm 26 is sufficiently longer than the operating crank 28, as appears in the drawings, so that the latter will impart to the former substantially or a little more than a quarter turn or ninety degree angular movement, for correspondingly imparting ninety degree step by step intermittent rotation to the ratchet disk 24 and larger gear 23, with intervening periods of rest of substantially the same length of time as is taken to make the quarter turn rotation, the periods of rest taking place during the return movement of the pawl-carrying rock arm 26, as will be readily understood. The larger gear 23 imparts intermittent rotation with intervening periods of rest to the smaller chain-driving gear 22. The intermittent traveling movement automatically imparted to the conveyer chain 1 will be of an extent or will extend over a space corresponding to that occupied by a plurality of the battery cells in the series thereof carried by the equidistantly spaced carrier brackets 12, and in the machine illustrated in the drawings, at each of its traveling movements the conveyer chain 1 will travel a distance corresponding to the space occupied by ten of these battery cells, so that during each period of rest of the carrier chain 1, the bottoms 14 of a plurality of ten of the battery cells will be polished at the same time by the rotating wire polishing wheels or brushes 21, and during the periods of movement the brass caps 16 will be polished as they move transversely across the peripheral faces of the grinding disks or grinding wheels 20, shown as four in number, so that each brass cap 16 receives four successive grindings, each of short duration. In the machine illustrated in the drawings the arrangements is such that the polishing of the end caps 16 takes place previously to that of the bottom disks 14. During the periods of rest of the cell-carrying conveyer chain 1, the arrangement is such that the battery cells carried thereby are not in a position for the brass caps 16 thereof to be in contact with the grinders 20. During such positions of rest the battery cells occupy positions between and out of contact with the grinders 20, as shown in Fig. 4, thereby avoiding prolonged and injurious abrasive action of the grinding wheels 20 upon the sheet metal caps 16.

Referring more particularly to the means for effecting the polishing or abrasive action upon the brass caps 16, it will be noted that the grinding wheels 20 are arranged in pairs and are spaced apart convenient distances. Each pair of grinding wheels 20 is carried by a shaft 32 which is journaled in the upper bifurcated end of a supporting bracket 33, and each of these pairs of abrasive wheels 20 is adapted to be rotated by means of a small pulley 34 fixed on the middle of each shaft 32 between the bearings thereof and adapted to be driven by means of a belt 35 which may be connected with any convenient source of power, such, for example, as usual overhead driving pulleys.

The grinding wheels 20 are shown as slightly conical or beveled so as to avoid the possibility of the side of a projecting end cap 16 striking against the side of a grinding wheel 20. Automatically acting means are provided for resiliently pressing the end caps 16 of the battery cells into engagement with the periphery of the grinding wheels 20, and for this purpose pressure applying rollers 36 are arranged opposite the grinding wheels 20 at the other side of the path of travel of the battery cells and at the rear of the conveyer chain 1, these rollers 36 being adapted yieldingly to press upon the bottom 14 of each battery cell at the grinding position. Each pressure applying roller 36 is carried by one arm of a bell-crank lever 37 which is pivoted on the frame of the machine and to the other rearwardly projecting arm of which a retractile spring 38 is connected for effecting the desired pressure of the roller 36 upon the bottom 14 of each battery cell while its end cap 16 is in contact with a grinding wheel 20 during the traveling movement of the conveyer chain 1. Between the pressure rollers 36 rear guards 39 are provided for the bottom ends of the battery cells, and between the grinding wheels 20 guards 40 are provided for the front ends of the battery cells and are adapted to engage the brass caps 16 thereof. Each of the metallic guards 40 is carried by a pair of metallic uprights 41 which at their lower ends are supported upon and insulated from the main frame piece 10, in order to prevent the short-circuiting of the battery cells, as is clearly shown in Fig. 11 of the drawings.

In view of the fact that the cell-carrying conveyer chain 1 during each period of movement travels a distance corresponding to that occupied by ten battery cells, it is evident that the bottoms 14 of ten of these cells must be polished during each period of rest, and accordingly a plurality of ten polishing brushes 21 is provided. It is not practical in the construction of the machine to locate the rotating polishing brushes 21 close enough together for polishing the bottoms 14 of adjacent or adjoining battery cells, and this is true particularly in view of the fact that each of the brushes 21 should be readily removable so as to be renewed or replaced by a new one when it wears out without the necessity of disturbing the other brushes, and accordingly it has been found most convenient to arrange these ten polishing brushes 21 in spaced relation and in a series of five pairs, similar in this respect to the arrangement of the abrasive wheels 20. However, care must be taken and a system must be followed in the spacing and arrangement of the polishing wheels 21, so that the bottom 14 of each of the battery cells will be subjected to a polishing operation and so that none of them will be polished twice. Inasmuch as the conveyer chain 1 moves forward or travels along ten spaces at a time, and the ten polishing wheels 21 will polish the bottom disks 14 of ten battery cells at each period of rest of the conveyer chain 1, it is possible to arrange the series of polishing wheels 21 in spaced relation so that at each stop of the carrier chain 1, those battery cells the bottom disks 14 of which have been polished will come to rest between the spaced polishing wheels 21, thereby assuring that each bottom disk 14 will be polished once only and that all of them will be thus polished. For example, in the arrangement illustrated in the drawings, and referring more particularly to Fig. 2, if we take, in the consecutive series, ten adjacent battery cells, the bottoms 14 of which have not yet been polished, the first movement of the carrier chain 1 will bring these ten adjacent cells within the range or zone of the polishing wheels 21, and three of these cells will be polished at the first step by the first three polishing wheels in the series from the right, and these three battery cells will be the first, the sixth and the eighth in the series of ten. At the second stop of the conveyer belt 1, three more of this series of ten battery cells will be polished by the next three polishing wheel in the series, these being the fourth, fifth and sixth polishing wheels of the series, and the battery cells polished by them will be the second, fifth and ninth in the consecutive series of ten. At the next or third stop three more battery cells will be polished by the polishing wheels which are seventh, eighth and ninth in the series, and the cells polished will be the third, seventh and tenth in the consecutive series of ten. This leaves only one of the battery cells still unpolished, this battery cell being the fourth in the series, and it will be polished at the fourth period of rest by the last or tenth wheel in the series of polishing wheels 21. Therefore, after the first stop of the conveyer belt 1, the first, sixth and eighth battery cells will have been polished and the second, third, fourth, fifth, seventh, ninth and tenth will remain unpolished; after the second stop of the conveyer belt 1 the first, second, fifth, sixth, eighth and ninth battery cells will have been polished while the third, fourth, seventh and tenth in the series of ten will remain unpolished; after the third stop the battery cells in the series of ten which have been polished will be nine in number, the fourth battery cell alone now remaining unpolished. After the fourth stop this fourth battery cell in the series of ten will have been polished, thus completing the polishing of the consecutive series of ten battery cells. It is to be kept in mind, however, that the bottoms 14 of ten battery cells are polished during each stop of the conveyer chain 1, by reason of the fact that at each movement of this chain ten more adjacently located cells are brought into the zone of the rotating polishing brushes 21. In the particular arrangement of the polishing wheels 21 followed in the machine illustrated in the drawings, the first two of these wheels, forming the first pair thereof, are shown as spaced apart a distance equal to the spacing of five battery cells on the conveyer chain 1; the distance between the second and third polishing wheels 21 is shown as equal to two spacings between the battery cells on the conveyer chain 1; the spacing between the polishing wheels 21 of the second, third, fourth and fifth pairs thereof, in each instance, is shown as being the same as that between four of the battery cells on the conveyer chain 1; the spacing between the fourth and fifth polishing wheels 21 in the series is shown as equal to that of three spaces of the battery cells; the spacing between the sixth and seventh polishing wheels in the series is shown as equal to four spacings of the battery cells, and the eighth and ninth polishing wheels 21 in the series are three spaces apart. It is to be understood, however, that this particular arrangement could be altered.

The polishing wheels or rotating brushes 21 of the first pair thereof, appearing at the right of the series thereof in Figs. 1, 2 and 4 and at the left of the series in Figs. 3 and 5, are removably mounted upon the opposite ends of a shaft 42 journaled in a bifurcated bearing bracket 43. The polishing wheels or brushes 21 of the remaining four pairs thereof are removably mounted upon the opposite ends of similar shafts 44 somewhat shorter than the shaft 42 and journaled in similar bifurcated bearing brackets 45 which are all alike and also are like or similar to the bearing brackets 33 for the grinding wheels 20 and are somewhat narrower than the wider bearing bracket 43 for the somewhat longer shaft 42. The shaft 42 for the first pair of the polishing wheels 21 and the four shafts 44 of the remaining four pairs of these polishing wheels are each provided at the middle thereof with a small belt pulley 46 and these pulleys 46 may be rotated by means of belts 47 extending from any suitable driving means, such, for example, as the usual overhead arrangement of shafting and drive pulleys.

Automatically acting resilient means are provided for yieldingly pressing the bottoms 14 of the battery cells into firm frictional engagement with the peripheries of the polishing brushes 21 during each period of rest of the conveyer belt 1. One double presser spring 48 and a plurality of nine single presser springs 49 are employed for pressing at their free ends upon the brass caps 16 of the cells, and these presser springs are carried by a movable presser bar 50 which in its retracted position during the periods of traveling movement of the cell-carrying conveyer chain 1 holds the free ends of the presser springs out of contact with the battery cells, as appears in Fig. 2 of the drawings, but which during each period of rest of the conveyer chain 1 and of the battery cells carried thereby is caused to move transversely toward the rear of the machine so that the free ends of the presser springs 48 and 49 will then press upon the projecting end caps 16 of the battery cells, as shown in Fig. 4. Means for operating the presser bar 50 and presser springs 48 and 49 carried thereby include upstanding lever arms 51, one at each end of the presser bar 50 and fixed at their lower ends upon a rock shaft 52 extending longitudinally of the machine at the front side thereof and shown as journaled in bearing brackets attached to the main frame piece or I-beam 10. This rock shaft 52 extends rearwardly toward the delivery end of the machine beyond the presser bar 50, and adjacent to its rear end has fixed thereon a short rearwardly projecting operating arm 53 provided at its free end upon the upper side thereof with a cam roller 54 which is adapted to be engaged by an operating cam 55 carried by the forward end of a shaft 56 upon which the hereinbefore mentioned worm wheel 29 is fixed at the rear end thereof, as most clearly appears in Fig. 12 of the drawings. The timing of the operating cam 55 is such that the presser bar 50 and the presser springs 48 and 49 carried thereby will be operated or moved to the cell-engaging position once during each period of rest of the cell-carrying conveyer chain 1. When not moved to and held at the engaging position of the presser springs by the cam 55, the presser bar 50 is retracted to hold the presser springs in spaced or disengaged relation relatively to the battery cells by means of a coiled retractile spring 57 acting upon the free end of a pin 58 which forms a lever projecting from the rock shaft 52, as shown in Figs. 5, 6, and 7 of the drawings. The free cell-engaging ends of the presser springs 48 and 49 are provided, as shown in Fig. 9, with metallic face plates or contact members 59 which are insulated from the presser springs 48 or 49, so as to prevent the short-circuiting of the battery cells by these presser springs. Screws 60, passing rearward through the presser bar 50 and adapted to engage the presser springs 48 and 49, are shown as provided for adjusting the strength of these springs so as to vary the amount of pressure applied to the battery cells in the bottom-polishing operation.

Means are provided for holding the battery cells down in the forked carrier brackets 12 of the conveyer chain 1 during the polishing operations, and for this purpose a series of presser springs 61 are carried by a stationary overhead bar 62 and press at their free ends on the top of the cylindrical cup bodies 13 of the battery cells at the respective polishing positions, the free cell-engaging ends of the presser springs 61 extending towards the delivery end of the machine. This arrangement appears most clearly in Figs. 4 and 5 of the drawings, Each of the seven bifurcated bearing brackets, comprising the two bearing brackets 33 for the two shafts 32 of the two pairs of grinders 20, the somewhat wider bearing bracket 43 for the longer shaft 42 of the first and more widely spaced pair of rotary brushes 21, and the remaining four bearing brackets 45 for the four shafts 44 of the remaining four pairs of rotary polishing brushes 21, is adjustably supported upon the main frame member or I-beam 10 by means of strong supporting rods 63 upon one end of each of which one of the above mentioned bifurcated supporting brackets is firmly fixed, and the other end of each of these supporting rods passes through and is adjustably but firmly secured to the I-beam 10 of the main frame. Flanged supporting members 64 are bolted to the web of the frame piece or I-beam 10, and an eccentric sleeve 65 is rotatively adjustable in each of the supporting members 64, and also extends into an opening through the web of the I-beam 10, as shown in Fig. 8. The adjacent end of the supporting rod 63 is screw-threaded and passes through a clamping washer 66 and through the eccentric sleeve 65, the outer end of which is provided with a head or flange. The supporting rod 63 and also the eccentric sleeve 65 may both be clamped in place upon the I-beam 10 by means of nuts 67 on the rod 63. By means of these nuts, the rod 63 may be adjusted longitudinally through the eccentric sleeve 65, and also when the nuts are loose, the eccentric sleeve 65 may be rotated for effecting a further adjustment vertically or laterally of the polishing brushes 21. For convenience in effecting this adjustment the head of the eccentric sleeve 65 is provided with a projecting pin 68 forming a handle. Means are provided for preventing any pair of the brushes 21 from falling over laterally to one side or the other when the nuts 67 are loosened. For this purpose an anchor stud or pin 69 projects downward from each of the bifurcated supporting brackets 33, 43 and 45 and at its lower end is received in a slot 70 provided in the outer free end of a projecting anchor member 71, the other end of which is secured to the lower side of the frame-forming I-beam 10, as shown in the drawings.

Between and beyond the polishing brushes 21 toward the delivery end of the machine, rear guides 72 are shown as provided for the bottom ends of the battery cells, and also front guides 73 are provided below the end caps 16, as shown in Fig. 12.

It is obvious that various modifications may be made in the construction shown in the drawings and above particularly described within the principle and scope of my invention.

I claim:

1. A battery polishing machine comprising carrier means for moving a series of cells from one location to another in substantially parallel relation and with their like ends projecting in the same direction substantially at right angles to the path of movement, one kind of polishing means for the bottoms of the battery cells arranged at right angles to the path of movement, polishing means of a different kind for the upper ends of the cells arranged at the other side of the path of movement and means for causing a more prolonged engagement of the polishing means of one kind with the lower end than of the polishing means of the other kind with the upper end of the cell.

2. A battery polishing machine comprising means for automatically imparting simultaneous intermittent traveling movement to a series of battery cells following one another consecutively and having their like ends projecting laterally transversely to the path of movement, an abrading device at one side of said path of movement for polishing the metal caps of the battery cells as they pass by during a period of movement, and a polishing device at the other side of said path of movement for polishing the bottoms of the zinc cups of the battery cells during a period of rest.

3. The invention claimed in claim 2 in combination with resiliently acting pressers for yieldingly pressing the battery cells into engagement with the respective abrading and polishing devices.

4. A battery polishing machine comprising automatically acting means for intermittently moving along a consecutive series of battery cells having like ends projecting in the same direction to the path of movement and arranged transversely thereof, the extent of such movement corresponding to the space occupied by a plurality of the battery cells in the series, an abrading device at one side of the path of movement for polishing the metal caps of the battery cells and arranged to be out of contact therewith during periods of rest of the battery cells, and a series of polishing devices at the other side of the path of movement of the battery cells and so arranged that the bottom of the zinc cup of each battery cell will be engaged by one of the polishing devices during one of the periods of rest and will not be engaged by any of the other polishing devices during the periods of rest of the battery cells.

5. A battery polishing machine comprising an endless conveyer adapted to move along a series of battery cells arranged transversely thereof with their like ends projecting toward the same side, automatic periodically acting means for intermittently moving the endless conveyer over successive distances corresponding to the space covered by a plurality of the battery cells on the endless conveyer with intervening periods of rest, a grinder for engaging the usual metal caps of the battery cells during a period of movement as the cells pass by and arranged to be out of contact therewith during the periods of rest of the battery cells, automatically acting resilient means for yieldingly pressing the caps of these battery cells into engagement with the grinder, a plurality of polishing devices for polishing the bottoms of the zinc cups of the battery cells and arranged in a series in spaced relation in such manner that the bottom of each battery cell will be engaged once by one of such polishing devices during a period of rest in the intermittent movement of the endless carrier, the polishing devices being so spaced that the cells not being polished come to rest between the polishing devices, and automatically acting resilient means for yieldingly pressing the battery cells into engagement with such bottom-polishing devices.

6. A battery polishing machine comprising means for automatically intermittently moving along a consecutive series of transversely arranged battery cells having their like ends projecting to the same side, the extent of such movement corresponding to the space occupied by a plurality of the battery cells in the consecutive series, and a series of polishing devices adapted to polish like ends of the battery cells during each successive period of rest, such polishing devices corresponding in number to the number of cells contained in the series in spaces covered by one movement but being spaced apart in the series a greater distance than the distance between adjacent battery cells in the series and so arranged as to polish each of the battery cells during the periods of rest.

7. The invention claimed in claim 6 in which the means for intermittently moving along the consecutive series of battery cells includes an endless conveyer, in combination with automatically acting driving means for imparting intermittent step by step traveling movement to the endless conveyer.

8. The invention claimed in claim 7 in combination with resilient means for yieldingly holding the battery cells in place upon the endless conveyer during the polishing operation.

9. A battery polishing machine comprising automatically acting means for intermittently moving along a consecutive series of transversely arranged battery cells having their like ends projecting to the same side, the extent of such movement corresponding to the space occupied by a plurality of the battery cells in the series, a series of abrading devices so arranged in spaced relation that the metal caps of the battery cells will engage the successive abrading devices during periods of movement of the battery cells and will come to rest between and out of contact with the abrading devices, and a series of polishing devices so arranged that the bottoms of the zinc cups of the battery cells will engage the successive polishing devices during periods of rest of the battery cells.

10. A battery polishing machine comprising means for intermittently moving a consecutive series of transversely arranged battery cells, a series of polishing devices adapted to polish a corresponding number of the battery cells, such polishing devices being spaced apart in the series a greater distance than the distance between adjacent battery cells in the series for thereby concurrently polishing a group of non-adjacent battery cells in the series, positioning means for causing the polishing devices to perform their polishing operations during successive periods of bodily rest relatively between the battery cells and the polishing devices, and means for successively shifting the relative positions of the polishing devices and the battery cells for thereby causing the polishing devices to operate successively upon different groups of the battery cells.

In testimony whereof, I have affixed my signature to this specification.

SECONDO L. CASELLA